(12) United States Patent
Cheek et al.

(10) Patent No.: US 8,196,936 B2
(45) Date of Patent: Jun. 12, 2012

(54) INDEPENDENT SUSPENSION FOR LAWNMOWERS, CUTTING DECKS AND OFF-ROAD VEHICLES

(76) Inventors: Elworth Cheek, Ramseur, NC (US); Tony D. Daye, Ramseur, NC (US)

( * ) Notice: Subject to any disclaimer, the term of this patent is extended or adjusted under 35 U.S.C. 154(b) by 456 days.

(21) Appl. No.: 12/482,808

(22) Filed: Jun. 11, 2009

(65) Prior Publication Data
US 2009/0308040 A1 Dec. 17, 2009

Related U.S. Application Data

(60) Provisional application No. 61/131,825, filed on Jun. 11, 2008.

(51) Int. Cl.
*A01D 75/28* (2006.01)
*B60S 9/08* (2006.01)
(52) U.S. Cl. ........ 280/6.155; 280/5.514; 701/37; 56/17.2
(58) Field of Classification Search .......... 280/5.514, 280/6.15, 6.154, 6.155; 701/37; 56/17.2
See application file for complete search history.

(56) References Cited

U.S. PATENT DOCUMENTS

| | | | | |
|---|---|---|---|---|
| 3,913,938 A | * | 10/1975 | Aikawa et al. | 280/6.158 |
| 3,917,295 A | * | 11/1975 | Hiruma | 280/5.507 |
| 5,258,913 A | * | 11/1993 | Baldauf | 701/37 |
| 5,709,394 A | * | 1/1998 | Martin et al. | 280/6.154 |
| 6,273,203 B1 | * | 8/2001 | Paggi et al. | 180/89.13 |
| 6,460,318 B1 | | 10/2002 | Ferris et al. | |
| 6,510,678 B2 | | 1/2003 | Ferris et al. | |
| 6,625,968 B2 | | 9/2003 | Gloudemans et al. | |
| 7,029,014 B2 | * | 4/2006 | Hamm | 280/5.502 |
| 7,146,786 B2 | | 12/2006 | Brandon | |
| RE39,477 E | * | 1/2007 | Nellers et al. | 280/754 |
| 7,197,863 B1 | | 4/2007 | Sugden | |
| 7,198,125 B2 | * | 4/2007 | Skelcher et al. | 180/89.13 |
| 7,208,896 B2 | * | 4/2007 | Ford et al. | 318/433 |
| 7,607,667 B2 | * | 10/2009 | Brookes et al. | 280/6.153 |
| 7,665,585 B2 | * | 2/2010 | Alexandridis | 188/280 |
| 2004/0154278 A1 | | 8/2004 | Samejima et al. | |
| 2004/0244348 A1 | | 12/2004 | Ferris | |
| 2007/0039304 A1 | | 2/2007 | Wright et al. | |
| 2007/0130902 A1 | | 6/2007 | Murawski | |
| 2007/0290493 A1 | | 12/2007 | David | |

* cited by examiner

*Primary Examiner* — Joseph Rocca
*Assistant Examiner* — Timothy Wilhelm
(74) *Attorney, Agent, or Firm* — James Ray & Assoc

(57) ABSTRACT

A suspension apparatus for off-road vehicle includes a plurality of linear actuators, each coupled to a power source and attached to a respective one of the plurality of wheels and frame or body of the vehicle for moving the respective one of the plurality of wheels away from the frame or the body upon receiving a first command signal or moving the respective one of the plurality of wheels toward the frame or the body upon receiving a second command signal. Tilt sensors are provided with each tilt sensor mounted directly on or in close proximity to the respective one of the plurality of wheels for sensing its vertical attitude relative to a predetermined level condition and selectively generating each of a first and second position signals. A control device receives first and second position signals and outputs respective first and second command signals.

18 Claims, 4 Drawing Sheets

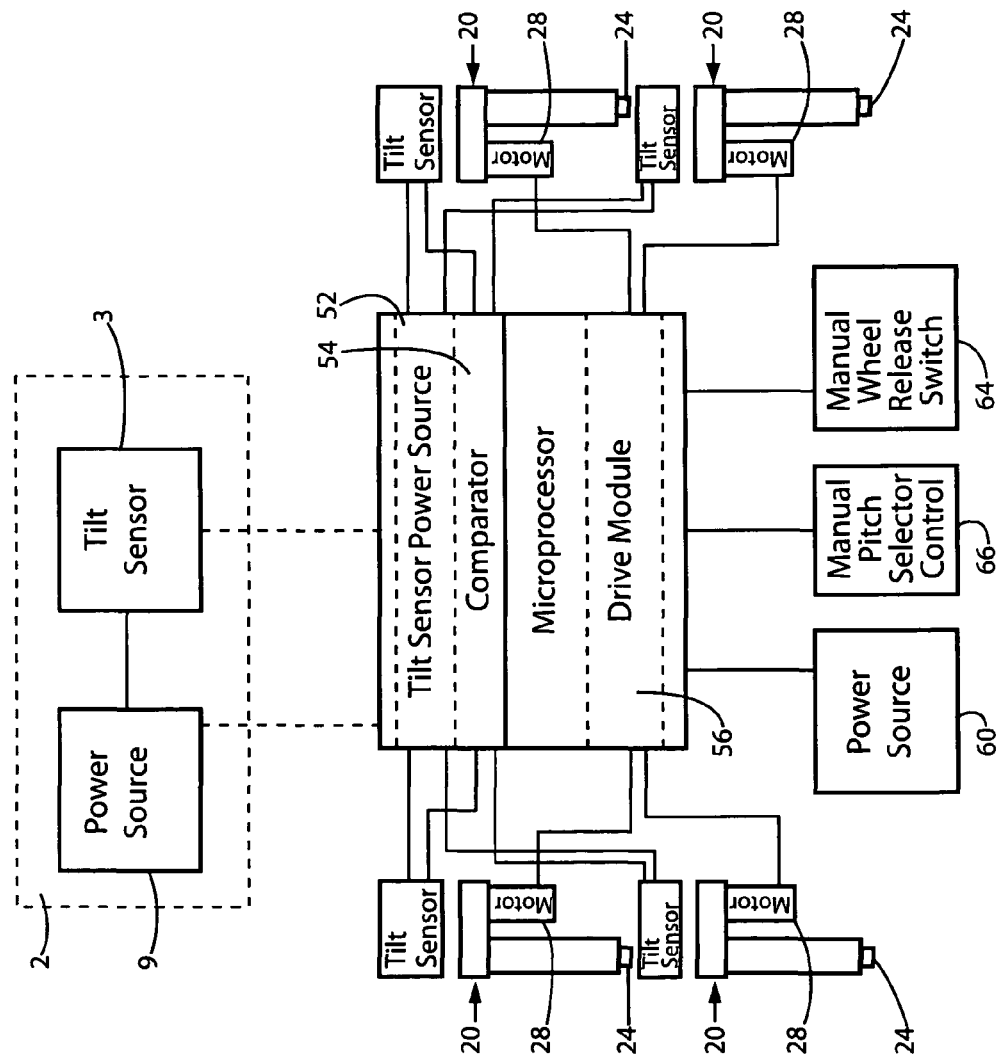

INDEPENDENT SUSPENSION FOR LAWNMOWERS, CUTTING DECKS AND OFF-ROAD VEHICLES

CROSS-REFERENCE TO RELATED APPLICATIONS

This application is related to and claims priority from Provisional Patent Application Ser. No. 61/131,825 filed on Jun. 11, 2008.

FIELD OF THE INVENTION

The present invention relates, in general, to suspension for lawnmowers, cutting decks, tractors and the like off-road vehicle and, more particularly, this invention relates to a suspension apparatus employing pluralities of linear actuators and tilt sensors for independent wheel control.

STATEMENT REGARDING FEDERALLY SPONSORED RESEARCH AND DEVELOPMENT

N/A

REFERENCE TO SEQUENCE LISTING, A TABLE, OR A COMPUTER PROGRAM LISTING COMPACT DISC APPENDIX

N/A

BACKGROUND OF THE INVENTION

As is generally well known, riding lawnmowers, mowing decks and various off-road vehicles can be difficult and unsafe to operate on inclined or other uneven terrains due to the fixed vertical spacing between the wheels and equipment body or frame. The vehicle can easily tip over potentially causing serious injury to the rider and creating safety hazards to others being in close proximity.

Thus, it is recommended to operate such vehicles in up/down mode rather than across the inclined. However, such mode of operation may not be possible due to spatial limitations, for example when mowing grass along a roadway, or economically feasible.

Therefore, there is a need for an apparatus that alleviates safety hazard of operating riding lawnmowers, mowing decks and various off-road vehicles on an inclined or uneven terrain.

SUMMARY OF THE INVENTION

The invention provides a suspension apparatus for off-road vehicle. The suspension apparatus includes a plurality of linear actuators. Each of the plurality of linear actuators is coupled to a power source and is attached to a respective one of the plurality of wheels and frame or body of the vehicle for moving the respective one of the plurality of wheels away from the frame or the body upon receiving a first command signal or moving the respective one of the plurality of wheels toward the frame or the body upon receiving a second command signal. Tilt sensors are also provided. Each tilt sensor is mounted directly on or in close proximity to the respective one of the plurality of wheels for sensing its vertical attitude relative to a predetermined level condition and selectively generating each of a first and second position signals. There is a control device that receives the first and second position signals and outputs respective first and second command signals. An optional manually operable user switch may be also provided.

OBJECTS OF THE INVENTION

It is, therefore, one of the primary objects of the present invention to provide a suspension apparatus for independently controlling vertical attitude of each wheel of a riding lawnmower, mowing deck and off-road vehicle relative to its body or frame.

Another object of the present invention is to provide an independent suspension apparatus for an off-road vehicle that is capable of mowing each wheel away and towards a frame or body member of such off-road vehicle.

Yet another object of the present invention is to provide an independent suspension apparatus for an off-road vehicle that employs a tilt sensor for sensing attitude levels of each wheel.

A further object of the present invention is to provide an independent suspension apparatus for an off-road vehicle that employs linear actuator for mowing each wheel.

Yet a further object of the present invention is to provide an independent suspension apparatus for an off-road vehicle that employs a dedicated power source.

Additional object of the present invention is to provide an independent suspension apparatus for an off-road vehicle that employs a manually operable switch for releasing extended wheels.

In addition to the several objects and advantages of the present invention which have been described with some degree of specificity above, various other objects and advantages of the invention will become more readily apparent to those persons who are skilled in the relevant art, particularly, when such description is taken in conjunction with the attached drawing Figures and with the appended claims.

BRIEF DESCRIPTION OF THE DRAWINGS

FIG. 5 illustrates a block diagram of a power and control arrangement in accordance with another embodiment of the invention.

BRIEF DESCRIPTION OF THE VARIOUS EMBODIMENTS OF THE INVENTION

Figure 1:
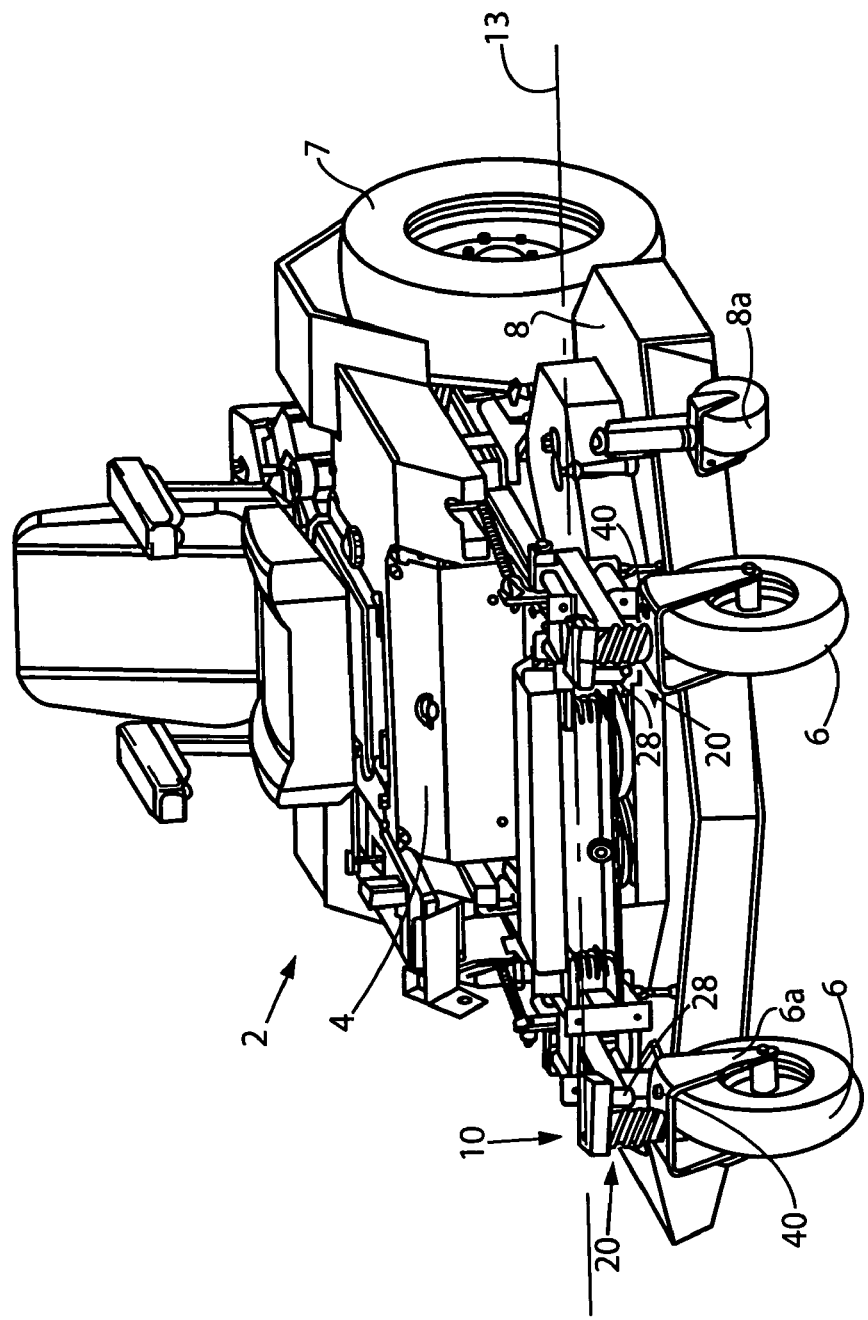
FIG. 1 is a perspective view of a ride-on lawnmower employing independent suspension apparatus of the present invention.
Figure 4:
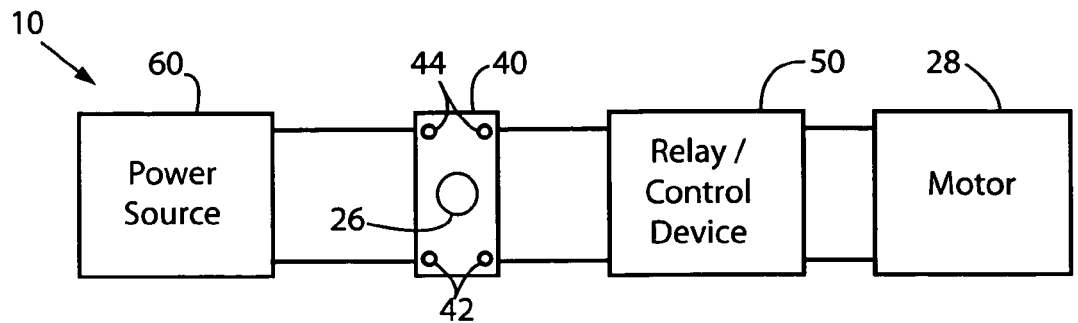
FIG. 4 illustrates a block diagram of a power and control arrangement in accordance with one embodiment of the invention.

Prior to proceeding to the more detailed description of the present invention, it should be noted that, for the sake of clarity and understanding, identical components which have identical functions have been identified with identical reference numerals throughout the several views illustrated in the drawing figures.

It is to be understood that the definition of an incline applies to a hill, slope, embankment or uneven terrain.

The present invention describes an independent suspension apparatus (herein described as the "apparatus"), generally designated as 10, for off-road vehicles such as lawnmowers, cutting decks and tractors and the like vehicles, which provides means to independently adjust vertical attitude (position) of the wheels relative to the frame or body of such off-road vehicle when operating on an incline.

The present invention is illustrated and described in combination with a ride-on lawnmower 2, although it will be apparent to those skilled in the relevant art that the present invention may be easily applied to moving decks and off-road vehicles, such as tractors and the like vehicles and as such should not be interpreted as a limiting factor of the device 10 of the present invention.

Reference is now made, to FIGS. 1-5, wherein there is shown a lawnmower 2 of a conventional ride-on type and its detail description will be omitted here for the sake of brevity. By way of one example only, such ride-on lawnmower may be of the type as disclosed in U.S. Pat. No. 6,510,678 issued to Ferris et al. and whose teachings are incorporated into this document by reference thereto. Briefly, such lawnmower 2 has a frame or body 4 and a pair of front wheels 6 and a pair of rear wheels 7 disposed underneath thereof. There is also at least one cutting deck 8 supported by at least one cutting deck wheel 8a.

The apparatus 10 is provided for independently adjusting position of each wheel 6, 7 relative to the frame or body 4. Such apparatus 10 includes a plurality of powered means. Each of the plurality of powered means is operatively mounted between each of a respective wheel 6, 7 and the one of the frame and the body 4 for moving the respective wheel 6 away from the frame or body 4 upon receiving a first command signal or moving the respective wheel 6, 7 toward the one of the frame or body 4 upon receiving a second command signal. It is presently preferred for such powered means to be a linear actuator. In the most presently preferred embodiment, such linear actuator is a screw drive assembly, generally designated as 20, having each of a stationary portion 22 thereof attached to the frame or body 4, an end 26 of a moveable portion 24 thereof connected to the respective wheel 6, 7 and an electric motor 28, preferably of a direct current (DC) type, coupled to a source of electric power and rotatable in a first direction upon receiving the first command signal for moving the movable portion 26 outwardly relative to the stationary portion 24 and rotatable in an opposed direction upon receiving the second command signal for moving the movable portion 24 inwardly relative to the stationary portion 22. Thus, each of the wheels 6, 7 is reciprocally movable in a linear direction. By way of one example only, such screw drive assembly 20 may be constructed in accordance with U.S. Pat. No. 6,234,034 issued to Ando and whose teachings are incorporated into this document by reference thereto.

Figure 2:
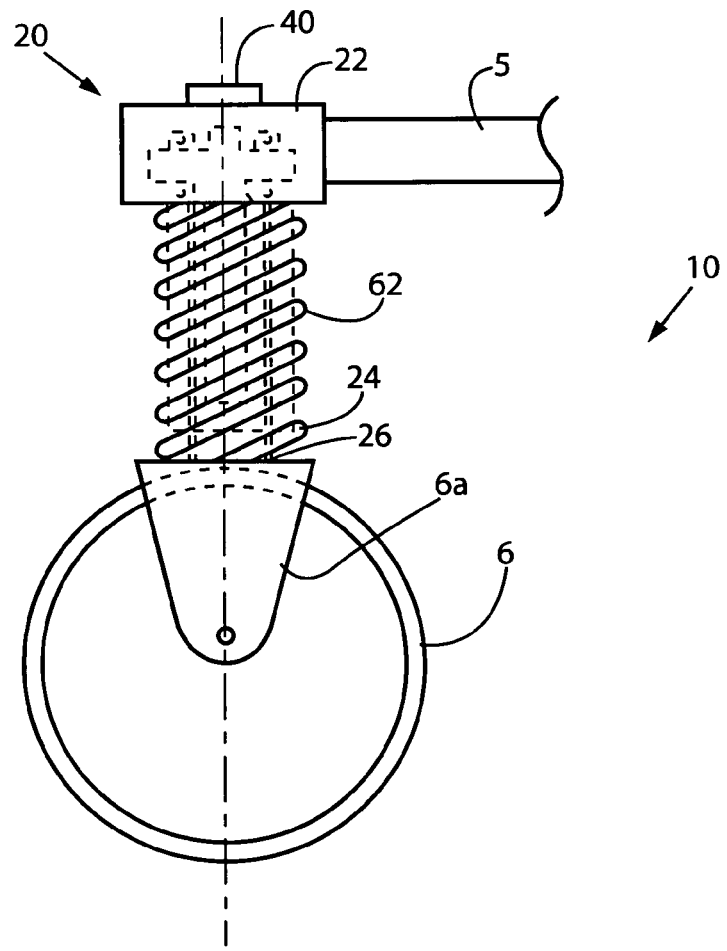
FIG. 2 is a partial side elevation view of the suspension apparatus of FIG. 1, particularly illustrating electrically driven linear actuator attached to a front wheel of such ride-on lawnmower.
Figure 3:
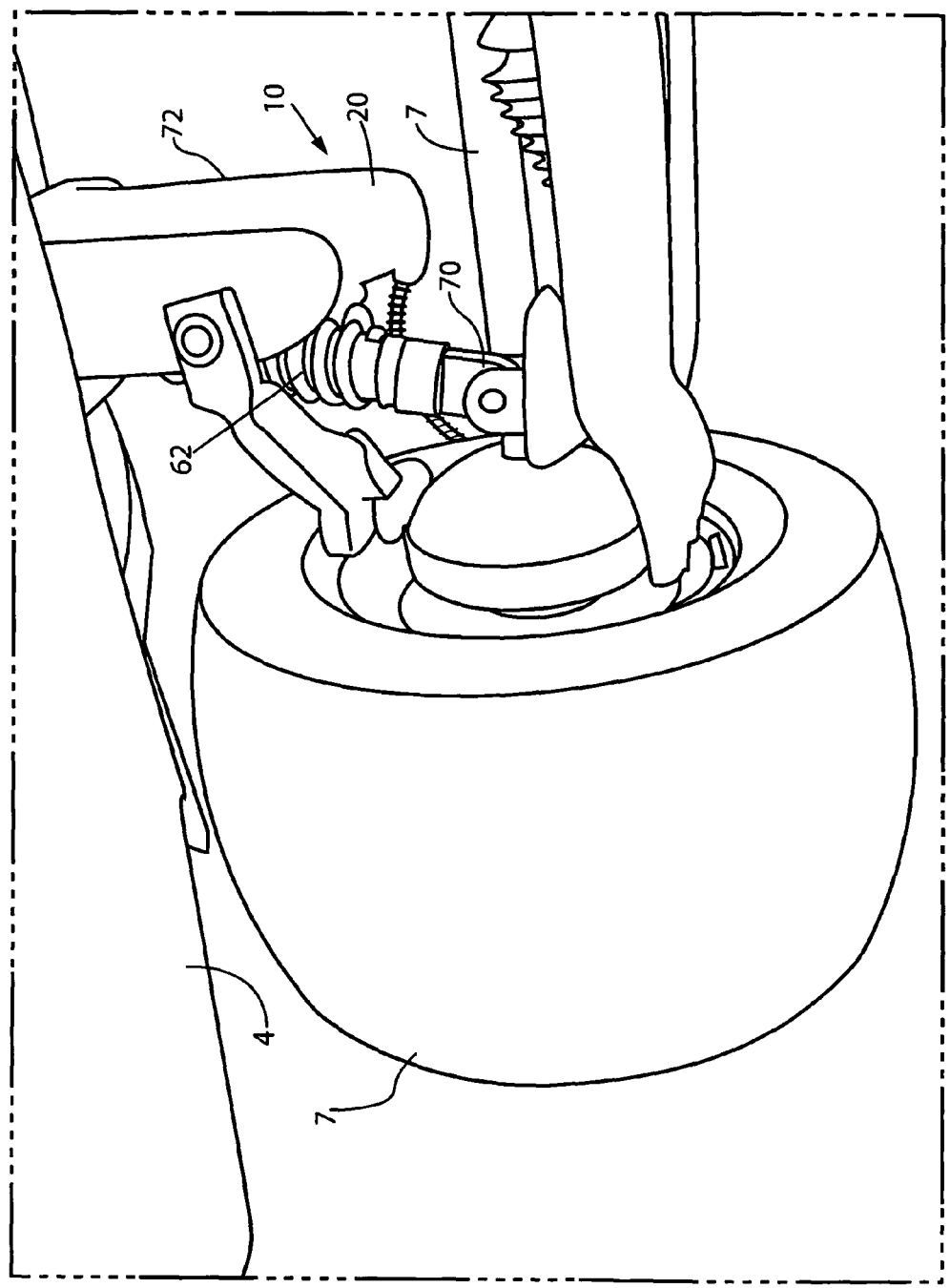
FIG. 3 is a perspective view of the suspension apparatus of FIG. 1, particularly illustrating electrically driven linear actuator attached to a rear wheel of such ride-on lawnmower.

It must be also noted that mounting arrangement of the screw drive assemblies 20 depends on the physical structure of the lawnmower 2. For example, as best shown in FIG. 2, the stationary portion 24 on the front wheels 6 may be rigidly attached to the wheel supporting members 5 of the lawnmower 2, while mounting of the screw drive assemblies 20 at the rear wheels 7 may require use of pivots 70 and brackets 72 at one end of the half axle 7, as best shown in FIG. 3, so as to accommodate rear half axle 7 of the lawnmower 2. It will be further required to connect the opposed end of the rear half axle 7 in a pivotal or swivel manner to the stationary rear portion of the drive unit (not shown) of such lawnmower 2 so as to allow such rear half axle 7 to move in a vertical direction.

There is also means for sensing tilt attitude of the lawnmower 2. In accordance with one embodiment of the invention, such means may be a tilt sensor 3 already integrated into the lawnmower 2 for the above purpose. Or, an independent tilt sensor 40 may be installed on a predetermined horizontal portion of the lawn mower 2 either alone or in combination with the existing tilt sensor 3. Such tilt sensor 40 may be selected from a group of well known inclinometer types including but not limited to an accelerometer, a capacitive tilt sensor, an electrolytic tilt sensor, a gas bubble in liquid, a mercury tilt sensor, and a pendulum which is a rotary shaft encoder coupled to a weight.

The tilt sensor 40 of the accelerometer type may be selected from a group of well known accelerometer sensor technologies including but not limited to a capacitance, an electromechanical servo, a resonating beam, a piezoelectric, a piezoresistive, a piezo film, a bulk micromachined piezoresistive, a bulk micromachined capacitive, a bulk micromachined resonating beam, and a surface micromachined capacitive.

If the tilt sensor 40 is a mercury tilt sensor, it is of at least a double throw type having two sets of contacts 42 and 44. The mercury tilt sensor 40 is mounted on the lawn mower 2 in a position to sense tilt thereof along the axis 13 disposed transverse to the moving direction of the lawn mower 2. Accordingly, as viewed in FIG. 4, one set of contacts, referenced with numeral 42 is associated with wheels 6, 7 on one side of the lawn mower 2 and generates a first position signal, being essentially an attitude proportional signal, upon contact with the bubble 46, while the second set of contacts, referenced with numeral 44, is associated with wheels 6, 7 on the opposed side of the lawn mower 2, and generates a second position signal, which is also essentially an attitude proportional signal. Each of the first and second position signals is received by a control device 50 which may be a relay but is preferably of a microprocessor type executing a predetermined logic. The control device 50 is electrically coupled, either directly or indirectly to each motor 28, depending on a particular construction of each of the motor 28 and the control device 50. By way of this predetermined logic, receipt of the first position signal enables the control device 50 to generate a first command signal essentially routing power to the respective motors 28 and further causing outward movement of the respective wheels 6, 7. When the lawnmower 2 returns to level position, the bubble 46 moves away from the set of contacts 42 discontinuing the first position signal. The control device 50 then generates a second command signal essentially reversing polarity of the respective motors 28 and mowing (retracting) the respective wheels 6, 7 towards the frame or body 4 and into the original position. Equally as well, receipt of the second position signal causes the control device 50 to operate the pair of wheels 6, 7 on the opposed lateral side of the lawn mower 2. As is well known, reverse of the direction of rotation of a DC motor 28 is achieved either by reversing armature connections or reversing both the shunt and series field connections.

In combination with the control device 50 of the microprocessor type, it is advantageous to employ the tilt sensor 40 of an inclinometer type so as to enable fine incremental attitude adjustments of the wheels 6, 7. The inclinometer may be disposed integral within the control device 50. It would be appreciated that the control device 50 will be adapted with a tilt sensor power source 52, a comparator module 54 receiving at least one attitude proportional signal from the accelerometer and comparing it with a predetermined threshold value defining a substantially level attitude. The comparator 54 than provides at least one drive signal to a driver module 56. Upon receipt of the drive signal, the drive module 56 outputs the first or second command signal that may be of a pulse with modulation type so as to command the respective motors 28 to lower or raise the respective wheels 6, 7 relative to the frame or body 4.

In accordance with the most presently preferred embodiment of the invention, the tilt sensing means includes a plurality of tilt sensors 40. Each of the plurality of tilt sensors 40 is positioned directly on or in close proximity to the respective wheel 6, 7 for sensing vertical position or attitude of the respective wheel 6, 7 relative to a horizontal level condition and selectively generating each of the first and second position signals. Thus, the vertical attitude of each wheel 6, 7 is independently sensed and controlled so as to enhance horizontally level condition of the frame or body 4 during operation on the inclined terrain. By way of one example of FIG. 2, such tilt sensor 40 may be mounted directly onto the stationary portion 22 of the linear actuator 20. By way of another example of FIG. 1, such tilt sensor 40 may be mounted onto the bracket 6a of the front wheel 6.

The power source may be a battery 9 of the lawnmower 2, however, it is presently preferred, for the sake of safety, to provide an independent power source 60 which may be a conventional direct current (DC) battery but may also be a hydraulically operated electric generator of the type as disclosed in U.S. Pat. No. 4,278,928 issued to Griffiths et al. and whose teachings are incorporated into this document by reference thereto. The independent power source 60 enables the apparatus 10 to operate even when the operation of the lawnmower 2 has been disabled due to a malfunction.

The apparatus 10 may also includes an optional resilient compressible member, for example such as a coiled spring 62 best shown in FIGS. 2-3, surrounding at least the movable portion 24 of the screw drive assembly 20 and having one end thereof abuttingly engaging a portion of the respective wheel 6, 7. In operation the coil springs at least partially absorbs shocks onto the lawnmower 2 due to uneven terrain.

Finally, the suspension apparatus 10 may include at least one optional switch 64 which is operable by the user to return extended wheels 6, 7 to its normal position due to malfunction of the lawnmower 2. Such switch 64 is most advantageous for use with a control device 50 of a microprocessor type and the independent power source 60. By way of one example, if the lawnmower 2 fails to operate while on the incline and cannot move under power, the switch 64 will enable the user to retract extended wheels 6, 7 for ease of transporting such failed lawnmower 2.

The present invention also contemplates that the user may preset attitude of the wheels 6, 7 disposed on one side of the lawnmower 2 when the pitch of the incline is known. Thus, a manual pitch selector control 66, which can be a conventional dial, is provided to allow the user to preset such pitch. Then, when at least one of the tilt sensors 40 detects change in attitude of the wheel or wheels 6, 7, the respective motors 28 will be commanded by the control device 50 to extend the respective wheels 6, 7 in accordance with the preset pitch.

Although the present invention has been shown in terms of using screw drive assemblies 20 to adjust vertical position of the wheels 6, 7 relative to the frame or body 4, it will be apparent to those skilled in the art, that the present invention may be applied to other types of linear actuators, such as a pneumatic or hydraulic cylinders.

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art without departing from the spirit and scope of the invention as set forth in the appended claims.

We claim:

1. In combination with at least one of a tractor, lawnmower and cutting deck having one of a frame and a body and a plurality of wheels disposed underneath thereof, a suspension apparatus for independently controlling attitude of each wheel, said suspension apparatus comprising:
   (a) a plurality of screw drive assemblies, each of said plurality of screw drive assemblies having a stationary portion thereof attached to said one of said frame and said body, an end of a moveable portion thereof connected to a respective wheel and an electric motor coupled to a source of electric power and rotatable in a first direction for moving said respective wheel away from said one of said frame and said body upon receiving a first command signal, said electric motor rotatable in an opposite direction for moving said respective wheel toward said one of said frame and said body upon receiving a second command signal; and
   (b) at least one tilt sensor mounted in a predetermined position on said at least one of tractor, lawnmower and cutting deck, said at least one tilt sensor enabling each of said first and second command signals.

2. The suspension apparatus, according to claim 1, wherein said at least one tilt sensor is a double throw mercury switch.

3. The suspension apparatus, according to claim 1, wherein said at least one tilt sensor is an inclinometer.

4. The suspension apparatus, according to claim 1, wherein said at least one tilt sensor is a plurality of tilt sensors, each of said plurality of tilt sensors positioned directly on or in close proximity to said respective wheel for sensing vertical attitude of said respective wheel relative to a horizontal level condition and selectively enabling each of said first and second command signals.

5. In combination with at least one of a tractor, lawnmower and cutting deck having one of a frame and a body and a plurality of wheels disposed underneath thereof, a suspension apparatus for independently controlling attitude of each wheel, said suspension apparatus comprising:
   (a) a plurality of powered means, each of said plurality of powered means coupled to a power source and operatively attached to each of a respective one of said plurality of wheels and said one of said frame and said body for moving said respective one of said plurality of wheels away from said one of said frame and said body upon receiving a first command signal or moving said respective one of said plurality of wheels toward said one of said frame and said body upon receiving a second command signal;
   (b) a plurality of tilt sensors, each of said plurality of tilt sensors mounted directly on or in close proximity to said respective one of said plurality of wheels for sensing vertical attitude of said respective one of said plurality of wheels relative to a predetermined level condition and selectively generating each of a first and second position signals; and
   (c) a control device receiving said each of said first and second position signals and generating a respective one of said first and second command signals.

6. The suspension apparatus, according to claim 5, wherein said each tilt sensor is one of a double through mercury switch and an inclinometer.

7. The suspension apparatus, according to claim 5, wherein said suspension apparatus includes said power source.

8. The suspension apparatus, according to claim 5, wherein said suspension apparatus includes a plurality of resilient compressible members, each of said plurality of resilient compressible members mounted in a predetermined relationship relative to each of said respective one of said plurality of wheels and a respective one of said plurality of powered means.

9. The suspension apparatus, according to claim 5, wherein said each powered means is a linear actuator.

10. The suspension apparatus, according to claim 9, wherein said linear actuator is a screw drive assembly having each of a stationary portion thereof attached to said one of said frame and said body, an end of a moveable portion thereof connected to said respective one of said plurality of wheels and an electric motor coupled to a source of electric power rotatable in a first direction upon receiving said first command signal for moving said movable portion outwardly relative to said stationary portion and rotatable in an opposed direction upon receiving said second command signal for moving said movable portion inwardly relative to said stationary portion.

11. The suspension apparatus, according to claim 10, wherein said apparatus includes a coiled spring caged between said respective one of said plurality of wheels and said stationary portion of said screw drive assembly.

12. In combination with at least one of a tractor, lawnmower and cutting deck having one of a frame and a body and a plurality of wheels disposed underneath thereof, a suspension apparatus for independently controlling attitude of each wheel, said suspension apparatus comprising:
   (d) a power source generating a predetermined voltage; and
   (e) a plurality of devices, each of said plurality of devices adjustably controlling attitude of a respective one of said plurality of wheels relative to said one of said frame and said body, said each device including:
      (i) a power operated screw drive assembly having a stationary portion thereof attached to said one of said frame and said body, an end of a moveable portion thereof connected to said wheel and an electric motor coupled to said power source and having an output shaft thereof rotatable in a first direction upon receiving a first command signal for reciprocally moving said movable portion outwardly relative to said stationary portion and rotatable in an opposed direction upon receiving a second command signal for moving said movable portion inwardly relative to said stationary portion,
      (ii) a coiled spring encasing at least said movable portions of said screw drive and having one end thereof abuttingly engaging a portion of said respective wheel, and
      (iii) a tilt sensor mounted one of directly on and in close proximity to said respective wheel, said tilt sensor operable for sensing vertical attitude of said respective one of said plurality of wheels relative to a predetermined level condition and selectively generating each of a first and second position signals;
   (f) a control device adapted to receive said each of said first and second position signals and output each of said first and second command signals; and
   (g) a manually operable user switch electrically coupled to said control device.

13. The suspension apparatus, according to claim 12, wherein said control device is a microprocessor controller.

14. The suspension apparatus, according to claim 13, wherein said tilt sensor is an inclinometer.

15. The suspension apparatus, according to claim 12, wherein said tilt sensor is mounted on said stationary portion of said power operated screw drive assembly.

16. The suspension apparatus, according to claim 12, wherein said tilt sensor is mounted directly on said respective wheel.

17. The suspension apparatus, according to claim 12, wherein said suspension apparatus includes a manually operable pitch selector control device.

18. In combination with at least one of a tractor, lawnmower and cutting deck having one of a frame and a body and a plurality of wheels disposed underneath thereof, a suspension apparatus for independently controlling attitude of each wheel, said suspension apparatus comprising:
   (a) a plurality of powered means, each of said plurality of powered means operatively attached to each of a respective wheel and said one of said frame and said body for moving said respective wheel away from said one of said frame and said body upon receiving a first command signal or moving said respective wheel toward said one of said frame and said body upon receiving a second command signal; and
   (b) a plurality of tilt sensors, each of said plurality of tilt sensors positioned directly on or in close proximity to said respective wheel for sensing vertical attitude of said respective wheel relative to a horizontal level condition and selectively enabling each of said first and second command signals, wherein said plurality of tilt sensors are mounted in a predetermined position on said at least one of tractor, lawnmower and cutting deck, said plurality of tilt sensors enabling each of said first and second command signals.

* * * * *